US011584002B2

(12) United States Patent
Lessing

(10) Patent No.: US 11,584,002 B2
(45) Date of Patent: *Feb. 21, 2023

(54) PRESSURIZING HOUSING FOR A SOFT ROBOTIC ACTUATOR

(71) Applicant: Soft Robotics, Inc., Bedford, MA (US)

(72) Inventor: Joshua Aaron Lessing, Cambridge, MA (US)

(73) Assignee: Soft Robotics, Inc., Bedford, MA (US)

(*) Notice: Subject to any disclaimer, the term of this patent is extended or adjusted under 35 U.S.C. 154(b) by 155 days.

This patent is subject to a terminal disclaimer.

(21) Appl. No.: 17/081,132

(22) Filed: Oct. 27, 2020

(65) Prior Publication Data

US 2021/0039250 A1 Feb. 11, 2021

Related U.S. Application Data

(63) Continuation of application No. 16/208,669, filed on Dec. 4, 2018, now Pat. No. 10,850,391.

(60) Provisional application No. 62/594,058, filed on Dec. 4, 2017.

(51) Int. Cl.
  *B25J 9/14* (2006.01)
  *F15B 15/10* (2006.01)
  *B25J 15/12* (2006.01)
  *B25J 15/00* (2006.01)
  *B25J 9/10* (2006.01)

(52) U.S. Cl.
  CPC ............. *B25J 9/142* (2013.01); *B25J 9/1075* (2013.01); *B25J 15/0023* (2013.01); *B25J 15/12* (2013.01); *F15B 15/103* (2013.01)

(58) Field of Classification Search
  CPC ...... B25J 9/142; B25J 9/1075; B25J 15/0023; B25J 15/12; F15B 15/103
  See application file for complete search history.

(56) References Cited

U.S. PATENT DOCUMENTS

| | | | | |
|---|---|---|---|---|
| 3,730,186 A | * | 5/1973 | Edmunds, Jr. | .... A61M 39/0208 128/DIG. 25 |
| 5,083,498 A | * | 1/1992 | Sato | ...................... F15B 15/103 92/92 |
| 5,263,753 A | * | 11/1993 | Breu | ...................... B65G 47/90 294/196 |
| 5,385,080 A | * | 1/1995 | Suzumori | ................ B25J 15/12 91/525 |
| 10,850,391 B2 | * | 12/2020 | Lessing | ................ B25J 15/0023 |

(Continued)

FOREIGN PATENT DOCUMENTS

JP 2013160238 A * 8/2013

*Primary Examiner* — Stephen A Vu
(74) *Attorney, Agent, or Firm* — Goodwin Procter LLP

(57) ABSTRACT

Exemplary embodiments relate to pressurizable housings for a soft robotic actuator. The pressurized housings may be divided into an upper chamber in fluid communication with an internal void of the actuator, and a lower chamber connected to an inlet and an outlet. The upper chamber and lower chamber may be separated by a piston. By supplying a fluid to the lower chamber via the inlet, the piston is moved into the space previously occupied by the upper chamber, which reduces the volume of the upper chamber and increases the pressure in the internal void. This action allows the actuator to be rapidly inflated, and further simplifies the pressurization system and reduces its weight.

20 Claims, 9 Drawing Sheets

(56) References Cited

U.S. PATENT DOCUMENTS

2015/0360372 A1* 12/2015 Schiettecatte ........ B25J 15/0023
156/60

* cited by examiner

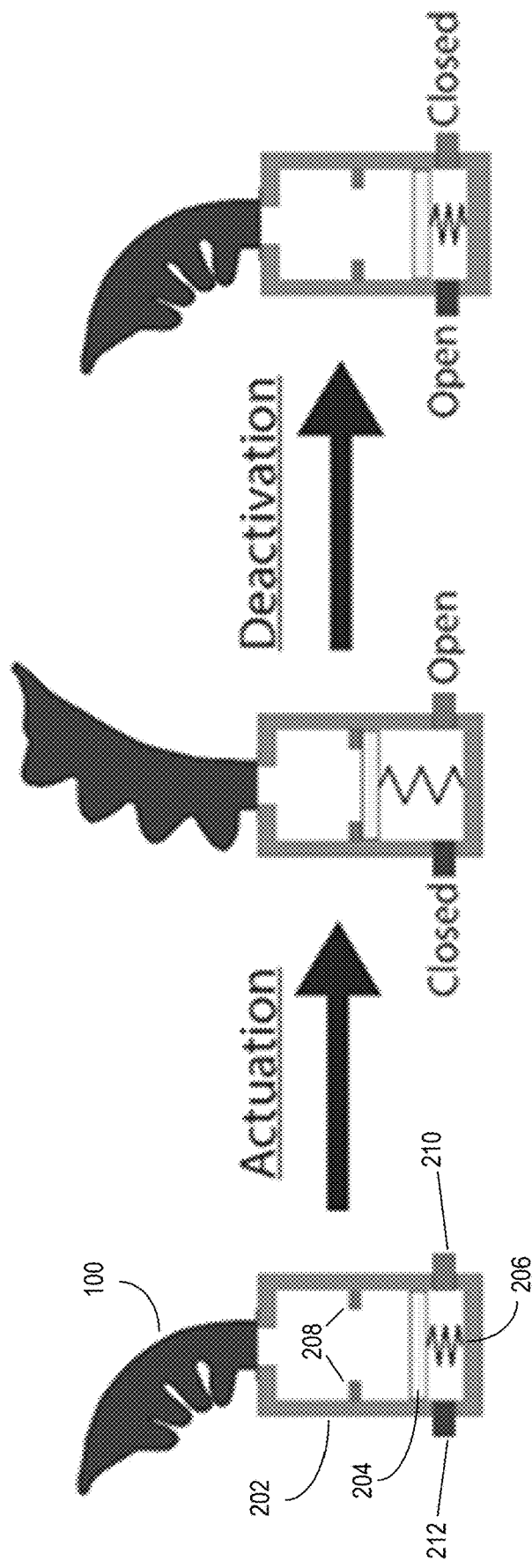

PRESSURIZING HOUSING FOR A SOFT ROBOTIC ACTUATOR

RELATED APPLICATIONS

This application is a Continuation application of U.S. Ser. No. 16/208,669, filed Dec. 4, 2018, which claims priority to U.S. Provisional Patent Application Ser. No. 62/594,058, filed on Dec. 4, 2017. The contents of the aforementioned application are incorporated herein by reference.

FIELD OF THE DISCLOSURE

The disclosure relates generally to the field of robotics and particularly to novel structures for pressurizing or depressurizing a soft robotic actuator.

BACKGROUND

Soft robotic actuators have generally been pressurized by supplying an inflation fluid to the internal reservoir of the actuator via a supply line. The inflation fluid may be delivered under action of a pressurizing device, such as a compressor or pump.

While effective, this configuration may have difficulty in supplying a high pressure in a short amount of time (due to limits on the amount of inflation fluid that can be supplied by the pressurizing device). This is particularly true when multiple actuators are inflated together, as might be the case with a gripper made up of several actuators. Thus, it may be difficult to cause a soft actuator to curl in a relatively fast or forceful manner.

Furthermore, conventional inflation mechanisms may to be relatively complex and costly. An operator of a robotic system may plan to use the system as part of a large automation line requiring many actuators, perhaps at several points along the production line. Still further, when retrofitting new actuators into an existing line, it may be difficult to fit a conventional model (including necessary mechanisms for inflation) into a small available space. Yet further, existing actuator assemblies may be more complex than necessary if the operator's needs are relatively simple.

Moreover, compressors and pumps tend to be heavy and relatively large, increasing the cost, weight, and size of the overall robotic system when deployed as part of, or in close proximity to, the gripper.

SUMMARY

According to one aspect of an embodiment of the present invention, a robotic end effector may include a soft robotic actuator. The soft robotic actuator may include an elastomeric outer surface surrounding an internal void. The soft robotic actuator may be configured to curl when an inflation fluid is supplied to the internal void.

The end effector may further include a pressurizable housing divided into a first space and a second space, the first space being in fluid communication with the internal void. A fixed amount of inflation fluid may be present in the first space, and a volume of the second space is manipulable to change a volume of the first space and thereby alter an internal pressure of the internal void. The pressurizable housing may be connected to a single actuator, or a group of actuators.

In some embodiments, the first space and second space may be divided by a piston. A set of upper stops above the piston may define a maximum extension of the piston and may be used to define a maximum inflation pressure of the actuator. A set of lower stops below the piston may define a minimum extension of the piston and may be used to define a maximum degree of reverse curl achievable by the actuator. The upper and/or lower stops may be fixed or adjustable.

The end effector may also include an inlet port for supplying a second space fluid to the second space, and an outlet port for exhausting the second space fluid from the second space. For instance, the exhaust port may be a valve. Alternatively, the exhaust port may be a pinhole opening, which may be provided in an orifice present in a disk capable of being inserted into the exhaust port. The second space fluid may be hydraulic, pneumatic, etc.

The end effector may also include tubing connected to the inlet port for supplying the fluid to the second space. The tubing may have a diameter of less than 10 mm, such as about 4 mm.

In some embodiments, a pressure sensor may be provided in the first space. The pressure sensor may detect an over- or under-pressure state, which may be indicative of a leak in the actuator, which may cause the actuator to fail.

In some embodiments, a method may include providing a robotic end effector as described above, and supplying the second space fluid to the inlet port. In further embodiments, the second space fluid may be exhausted via the exhaust port.

In yet further embodiments, an indication may be received at a controller, indicating that a pressure in the first space is unexpectedly low or unexpectedly high. In response to the indication, the controller may configured to perform at least one of the following actions: transmitting a warning message to an operator of the end effector; automatically stopping a machine to which the end effector is attached; stopping a manufacturing line including the machine to which the end effector is attached; or redirecting work from the machine to which the end effector is attached to another machine present on the same manufacturing line.

These and other embodiments are described in more detail below.

BRIEF DESCRIPTION OF THE DRAWINGS

FIGS. 3A-3C depict the state of the exemplary pressurized housing during actuation and de-actuation.

DETAILED DESCRIPTION OF THE PREFERRED EMBODIMENTS

Figure 1A:
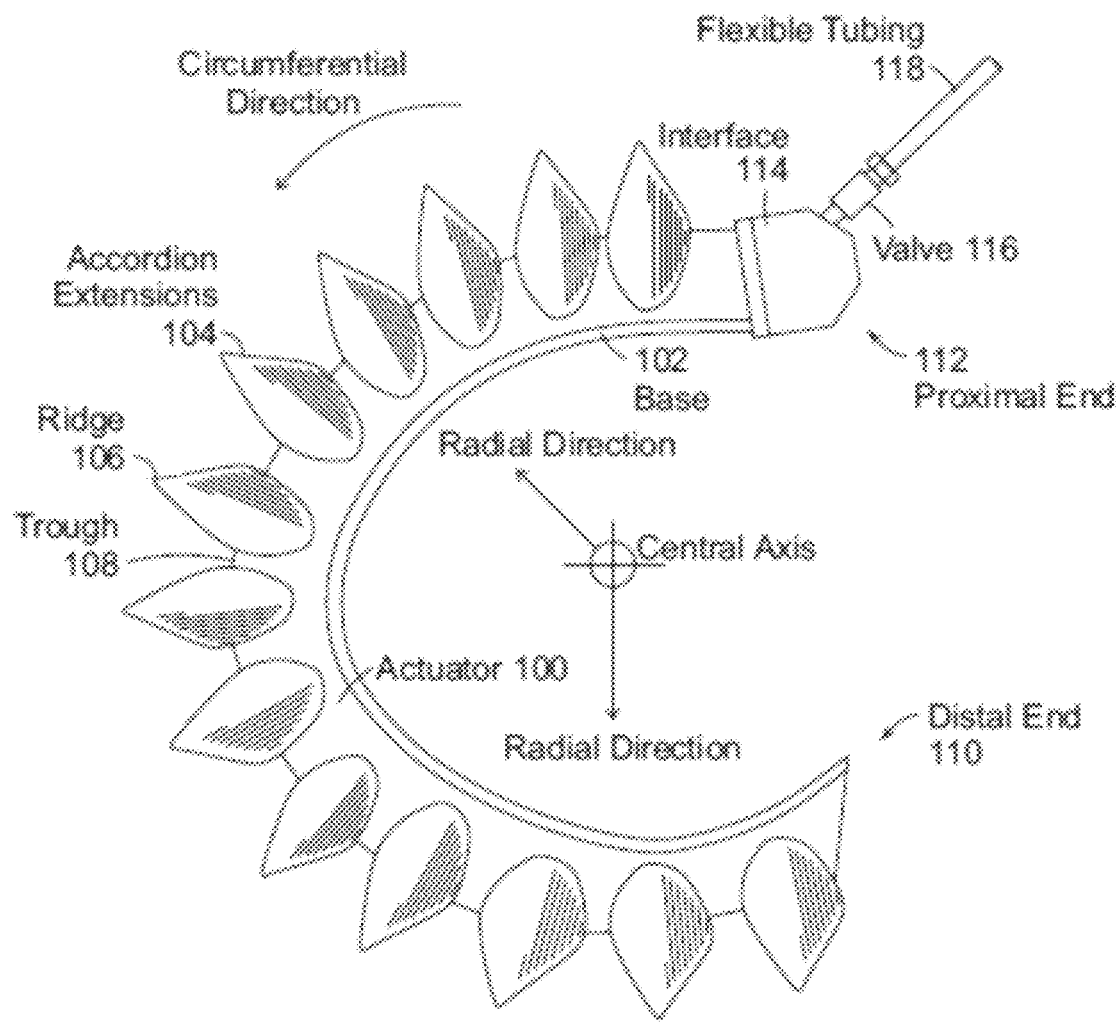
FIGS. 1A-1G depict various examples of soft robotic actuators.

The present invention will now be described more with reference to the accompanying drawings, in which preferred embodiments of the invention are shown. The invention, however, may be embodied in many different forms and should not be construed as being limited to the embodiments set forth herein. Rather, these embodiments are provided so that this disclosure will be thorough and complete, and will fully convey the scope of the invention to those skilled in the art. In the drawings, like numbers refer to like elements throughout.

Background on Soft Robotic Grippers Conventional robotic actuators may be expensive and incapable of operating in certain environments where the uncertainty and variety in the weight, size and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, coated fabric, or thin walls of plastic arranged in an accordion structure that is configured to unfold, stretch, twist, bend, extend and/or contract under pressure, or other suitable relatively soft materials. As an alternative or in addition to accordion structures, other types or configurations of soft actuators employing elastomeric materials may be utilized. They may be created, for example, by molding or bonding one or more pieces of the elastomeric material into a desired shape. Alternatively or in addition, different pieces of elastomeric material may be thermally bonded, or sewn. Soft robotic actuators may include a hollow interior that can be filled with a fluid, such as air, water, or saline to pressurize, inflate, and/or actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively or in addition, the actuator may be actuated using a vacuum to remove inflation fluid from the actuator and thereby change the degree to which the actuator bends, twists, and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. They can also deflect upon collision with an object, which may be particularly relevant when picking an object off of a pile or out of a bin, since the actuator is likely to collide with neighboring objects in the pile that are not the grasp target, or the sides of the bin. Furthermore, the amount of force applied can be spread out over a larger surface area in a controlled manner because the material can easily deform. In this way, soft robotic actuators can grip objects without damaging them.

Still further, soft actuators are adaptive, and accordingly a single fixture can grip multiple kinds of objects. Because the outer surfaces of soft actuators are relatively delicate, they can serve in roles such as redirectors for easily bruised or damaged items (e.g., tomatoes) whereas hard fixtures might be limited to manipulating more robust items (e.g., brass valves).

Furthermore, soft actuators will typically not mark the surface being gripped. Typically, when an easily-marked surface (e.g., a veneer) will be gripped by a hard fixture, a protective coating or film may be applied to prevent the part from being marked; this increases the cost of manufacturing. With a soft actuator, this step may be omitted and the part may be protected without a special coating or film.

Moreover, soft robotic actuators allow for types of motions or combinations of motions (including bending, twisting, extending, and contracting) that can be difficult to achieve with traditional hard robotic actuators.

Conventional robotic grippers or actuators may be expensive and incapable of operating in certain environments where the uncertainty and variety in the weight, size and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, or thin walls of plastic arranged in an accordion structure that is configured to unfold, stretch, and/or bend under pressure, or other suitable relatively soft materials. They may be created, for example, by molding one or more pieces of the elastomeric material into a desired shape. Soft robotic actuators may include a hollow interior that can be filled with a fluid, such as air, water, or saline to pressurize, inflate, and/or actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively or in addition, the actuator may be actuated using a vacuum to remove inflation fluid from the actuator and thereby change the degree to which the actuator bends, twists, and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. They can also deflect upon collision with an object, which may be particularly relevant when picking an object off of a pile or out of a bin, since the actuator is likely to collide with neighboring objects in the pile that are not the grasp target, or the sides of the bin. Furthermore, the amount of force applied can be spread out over a larger surface area in a controlled manner because the material can easily deform. In this way, soft robotic actuators can grip objects without damaging them.

Still further, soft actuators are adaptive, and accordingly a single fixture can grip multiple kinds of objects. Because the outer surfaces of soft actuators are relatively delicate, they can serve in roles such as redirectors for easily bruised or damaged items (e.g., tomatoes) whereas hard fixtures might be limited to manipulating more robust items (e.g., brass valves).

Furthermore, soft actuators will typically not mark the surface being gripped. Typically, when an easily-marked surface (e.g., a veneer) will be gripped by a hard fixture, a protective coating or film may be applied to prevent the part from being marked; this increases the cost of manufacturing. With a soft actuator, this step may be omitted and the part may be protected without a special coating or film.

Moreover, soft robotic actuators allow for types of motions or combinations of motions (including bending, twisting, extending, and contracting) that can be difficult to achieve with traditional hard robotic actuators.

Figure 1B:
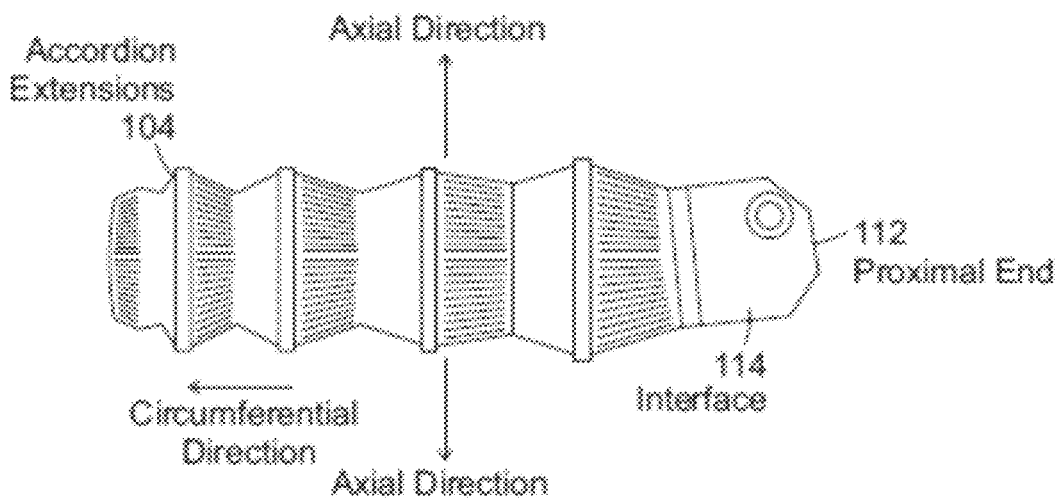
Figure 1C:
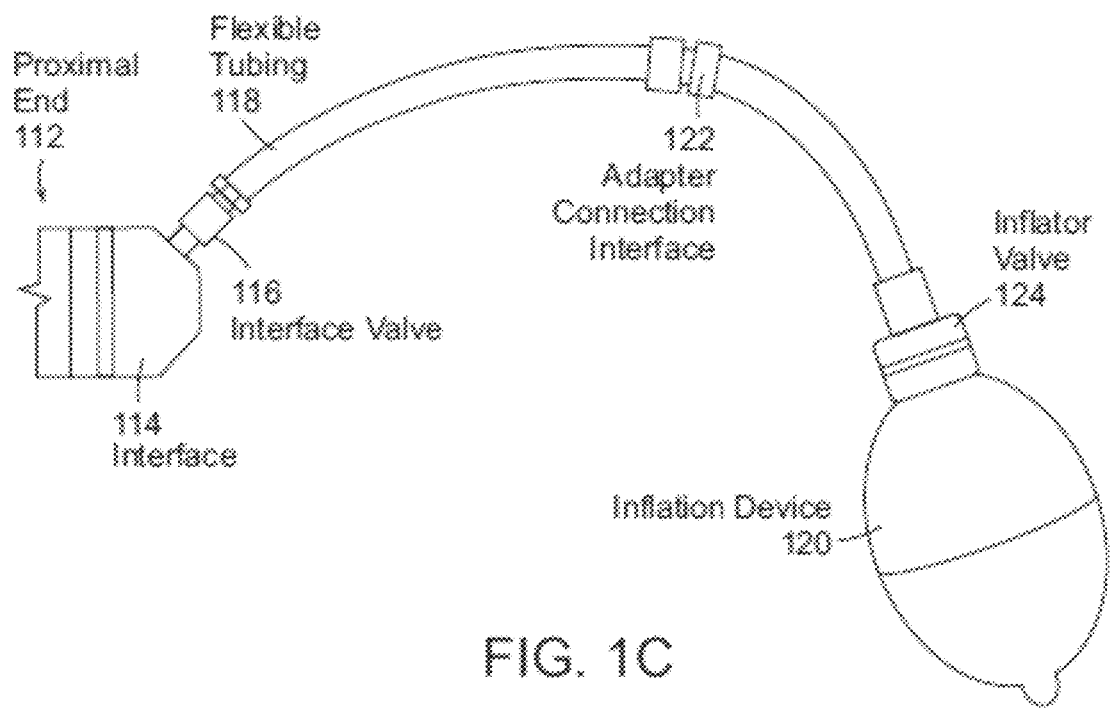
Figure 1D:
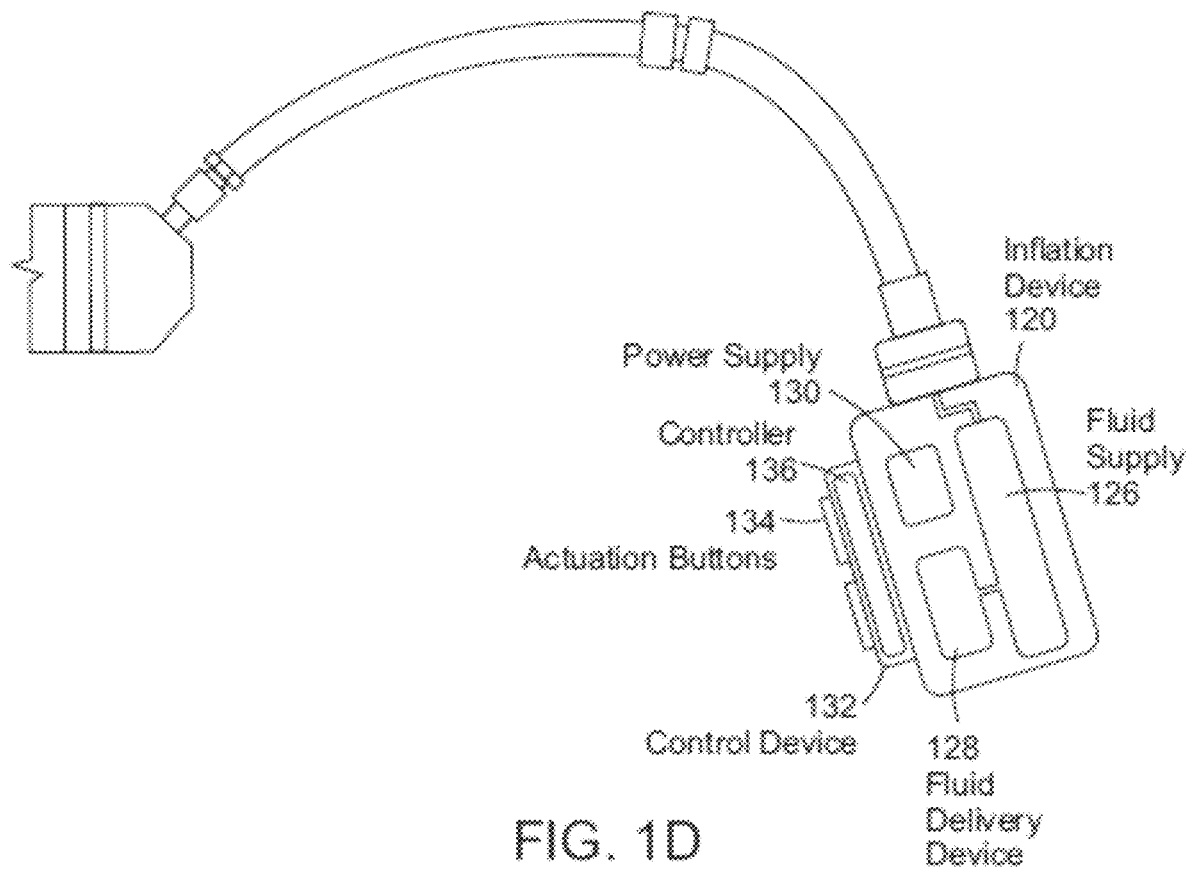

FIGS. 1A-1D depict exemplary soft robotic actuators. More specifically, FIG. 1A depicts a side view of a portion of a soft robotic actuator. FIG. 1B depicts the portion from FIG. 1A from the top. FIG. 1C depicts a side view of a portion of the soft robotic actuator including a pump that may be manipulated by a user. FIG. 1D depicts an alternative embodiment for the portion depicted in FIG. 1C.

An actuator may be a soft robotic actuator 100, as depicted in FIG. 1A, which is inflatable with an inflation fluid such as air, water, saline, or any suitable liquid, gas, gel, foam, etc. The inflation fluid may be provided via an inflation device 120 through a fluidic connection 118.

The actuator 100 may be in an uninflated state in which a limited amount of inflation fluid is present in the actuator 100 at substantially the same pressure as the ambient environment. The actuator 100 may also be in a fully inflated state in which a predetermined amount of inflation fluid is present in the actuator 100 (the predetermined amount corresponding to a predetermined maximum force to be applied by the actuator 100 or a predetermined maximum pressure applied by the inflation fluid on the actuator 100). The actuator 100 may also be in a full vacuum state, in which all fluid is removed from the actuator 100, or a partial vacuum state, in which some fluid is present in the actuator 100 but at a pressure that is less than the ambient pressure. Furthermore, the actuator 100 may be in a partially inflated state in which the actuator 100 contains less than the predetermined amount of inflation fluid that is present in the fully inflated state, but more than no (or very limited) inflation fluid.

In the inflated state, the actuator 100 may exhibit a tendency to curve around a central axis as shown in FIG. 1A. For ease of discussion, several directions are defined herein. An axial direction passes through the central axis around which the actuator 100 curves, as shown in FIG. 1B. A radial direction extends in a direction perpendicular to the axial direction, in the direction of the radius of the partial circle formed by the inflated actuator 100. A circumferential direction extends along a circumference of the inflated actuator 100.

In the inflated state, the actuator 100 may exert a force in the radial direction along the inner circumferential edge of the actuator 100. For example, the inner side of the distal tip of the actuator 100 exerts a force inward, toward the central axis, which may be leveraged to allow the actuator 100 to grasp an object (potentially in conjunction with one or more additional actuators 100). The soft robotic actuator 100 may remain relatively conformal when inflated, due to the materials used and the general construction of the actuator 100.

The actuator 100 may be made of one or more elastomeric materials that allow for a relatively soft or conformal construction. Depending on the application, the elastomeric materials may be selected from a group of food-safe, biocompatible, or medically safe, FDA-approved materials. The actuator 100 may be manufactured in a Good Manufacturing Process ("GMP")-capable facility.

The actuator 100 may include a base 102 that is substantially flat (although various amendments or appendages may be added to the base 102 in order to improve the actuator's gripping and/or bending capabilities). The base 102 may form a gripping surface that grasps a target object.

The actuator 100 may include one or more accordion extensions 104. The accordion extensions 104 allow the actuator 100 to bend or flex when inflated or deflated, and help to define the shape of the actuator 100 when in an inflated or deflated state. The accordion extensions 104 include a series of ridges 106 and troughs 108. The size of the accordion extensions 104 and the placement of the ridges 106 and troughs 108 can be varied to obtain different shapes or extension profiles.

Although the exemplary actuator of FIGS. 1A-1D is depicted in a "C" or oval shape when deployed, one of ordinary skill in the art will recognize that the present invention is not so limited. By changing the shape of the body of the actuator 100, or the size, position, or configuration of the accordion extensions 104, different sizes, shapes, and configurations may be achieved. Moreover, varying the amount of inflation fluid provided to the actuator 100 allows the actuator 100 to take on one or more intermediate sizes or shapes between the un-inflated state and the inflated state. Thus, an individual actuator 100 can be scalable in size and shape by varying inflation amount, and an actuator can be further scalable in size and shape by replacing one actuator 100 with another actuator 100 having a different size, shape, or configuration.

The actuator 100 extends from a proximal end 112 to a distal end 110. The proximal end 112 connects to an interface 114. The interface 114 allows the actuator 100 to be releasably coupled to other parts. The interface 114 may be made of a food- or medically-safe material, such as polyethylene, polypropylene, polycarbonate, polyetheretherketone, acrylonitrile-butadiene-styrene ("ABS"), or acetal homopolymer. The interface 114 may be releasably coupled to one or both of the actuator 100 and the flexible tubing 118. The interface 114 may have a port for connecting to the actuator 100. Different interfaces 114 may have different sizes, numbers, or configurations of actuator ports, in order to accommodate larger or smaller actuators, different numbers of actuators, or actuators in different configurations.

The actuator 100 may be inflated with an inflation fluid supplied from an inflation device 120 through a fluidic connection such as flexible tubing 118. The interface 114 may include or may be attached to a valve 116 for allowing fluid to enter the actuator 100 but preventing the fluid from exiting the actuator (unless the valve is opened). The flexible tubing 118 may also or alternatively attach to an inflator valve 124 at the inflation device 120 for regulating the supply of inflation fluid at the location of the inflation device 120.

The flexible tubing 118 may also include an actuator connection interface 122 for releasably connecting to the interface 114 at one end and the inflation device 120 at the other end. By separating the two parts of the actuator connection interface 122, different inflation devices 120 may be connected to different interfaces 114 and/or actuators 100.

The inflation fluid may be, for example, air or saline. In the case of air, the inflation device 120 may include a hand-operated bulb or bellows for supplying ambient air. In the case of saline, the inflation device 120 may include a syringe or other appropriate fluid delivery system. Alternatively or in addition, the inflation device 120 may include a compressor or pump for supplying the inflation fluid.

The inflation device 120 may include a fluid supply 126 for supplying an inflation fluid. For example, the fluid supply 126 may be a reservoir for storing compressed air, liquefied or compressed carbon dioxide, liquefied or compressed nitrogen or saline, or may be a vent for supplying ambient air to the flexible tubing 118.

The inflation device 120 further includes a fluid delivery device 128, such as a pump or compressor, for supplying inflation fluid from the fluid supply 126 to the actuator 100 through the flexible tubing 118. The fluid delivery device 128 may be capable of supplying fluid to the actuator 100 or withdrawing the fluid from the actuator 100. The fluid delivery device 128 may be powered by electricity. To supply the electricity, the inflation device 120 may include a power supply 130, such as a battery or an interface to an electrical outlet.

The power supply 130 may also supply power to a control device 132. The control device 132 may allow a user to control the inflation or deflation of the actuator, e.g. through one or more actuation buttons 134 (or alternative devices, such as a switch, an interface, a touch display, etc.). The control device 132 may include a controller 136 for sending a control signal to the fluid delivery device 128 to cause the fluid delivery device 128 to supply inflation fluid to, or withdraw inflation fluid from, the actuator 100.

Soft robotic actuators may be useful in many instances where a hard actuator is undesirable. For example, and without limitation, a soft actuator may pick up a packaging blank or preform and provide it to a blow molder, after which the blow molder may reshape the blank into the desired form based on the mold. After being shaped, the molded part will typically be quite hot and deformable. The molded part may be retrieved by the soft actuator without damaging or deforming the molded part. The actuator may then hold the molded part while it is being washed, labeled, filled, and/or capped. Other soft actuators may hold live animals gently, such as for inoculation, analysis or surgery.

One problem in conventional blow molding operations is that the object being grasped has a different shape before and after blow molding (transitioning form the packaging blank to the finally-formed product. Whereas a hard gripper may have difficulty adapting to the changing shape (thus perhaps requiring two different types of grippers for a single blow molding operation, a soft actuator may be sufficiently adaptable to grasp both object shapes using the same gripper.

Soft robotic actuators may be inflated with a predetermined amount of inflation fluid (or to a predetermined pressure), and the inflow/outflow of the actuators and/or the internal pressure of the actuator may be measured. Upon making contact with an object, the actuator may be deflected and, as a result, inflation fluid may flow out of (or into) the actuator. This flow of inflation fluid may serve as a detector that indicates the presence of an object at a position or generally in contact with the actuator. Alternatively, the actuator may include touch sensors, bending sensors, or other types of detection devices for registering contact with an object.

Figure 1E:
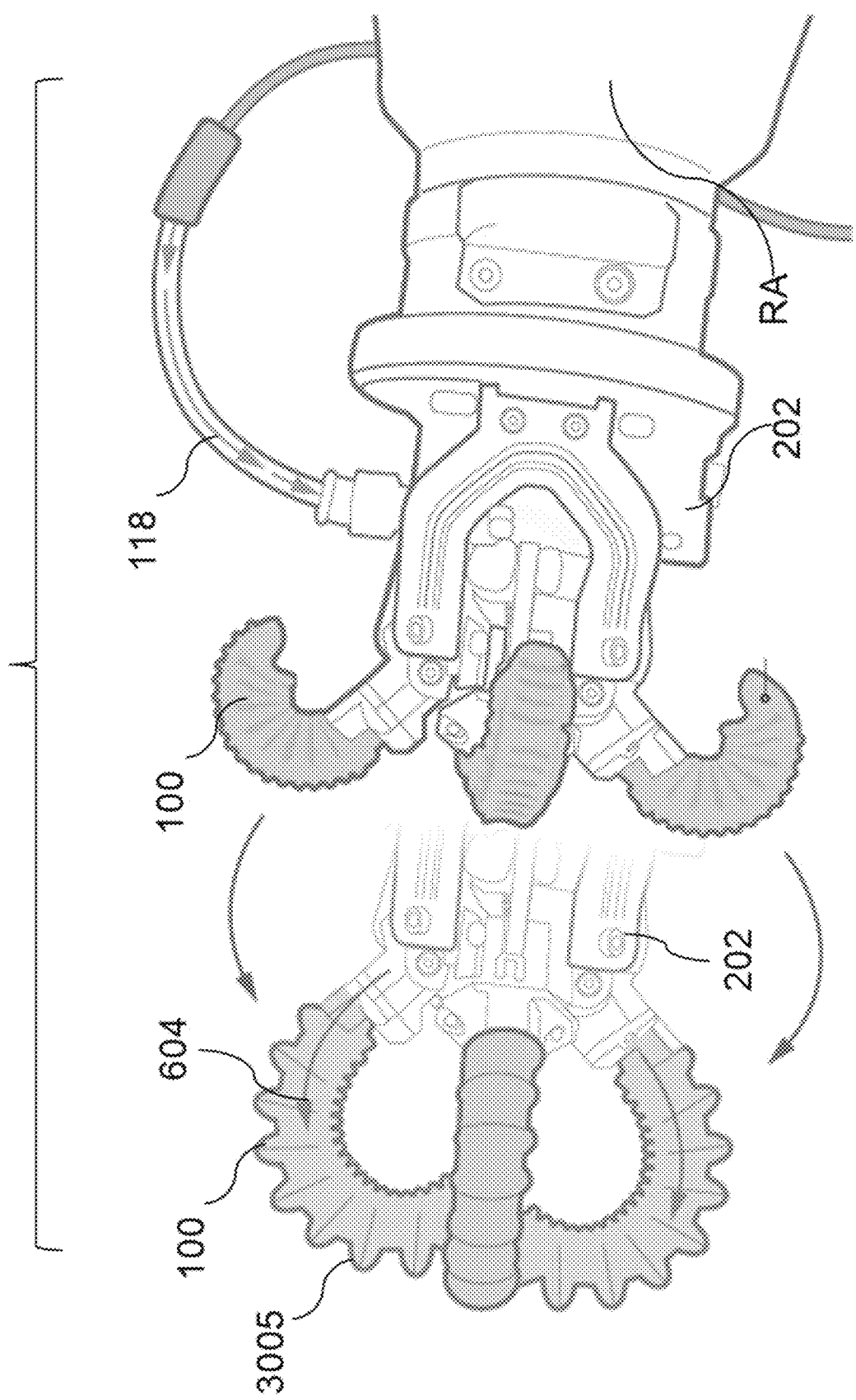

FIG. 1E depicts a soft robotic actuator 100 with multiple fingers, in which the gripper hub 202 is attached to a robot arm RA, in which the fluid supply for actuation is provided via an external fluid line 118. The fingers 100 are shown in a reverse curled position and curled in the direction 604.

Figures 1F, 1G:
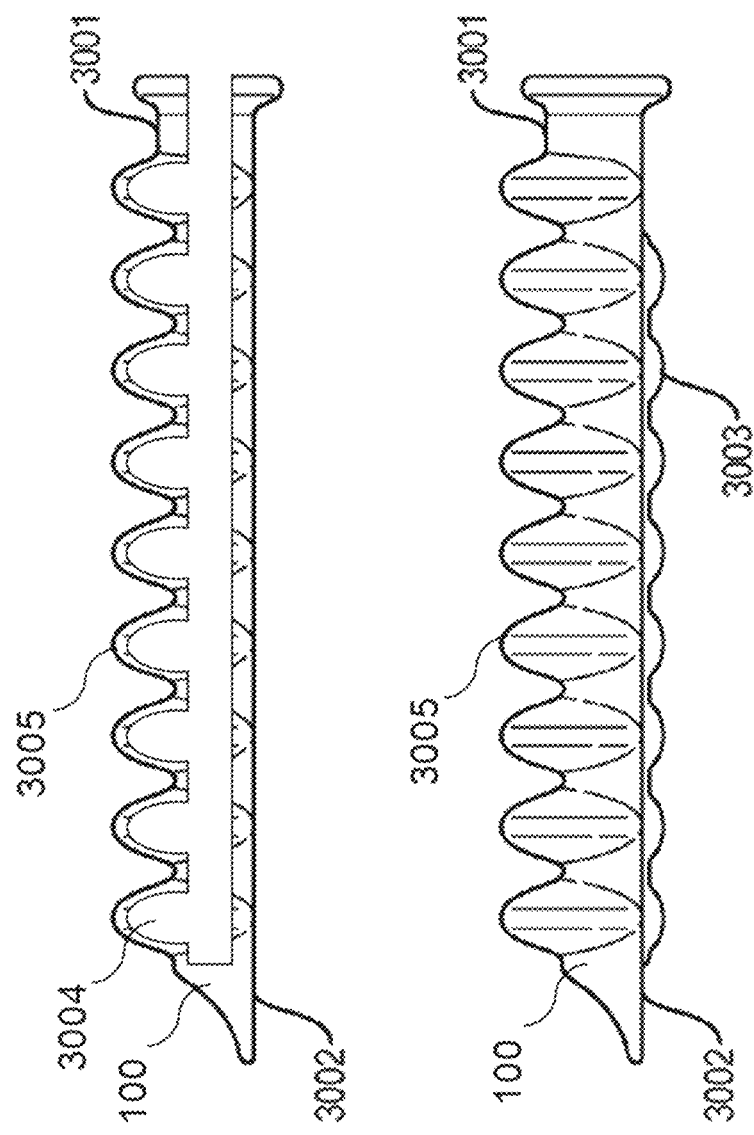

FIGS. 1F and 1G depict a soft robotic actuator finger 100 that may be used with any embodiment discussed herein. Each finger 100 or actuator 100 includes an elastomeric outer surface 3005 surrounding an internal void 3004, and the is configured to curl when an inflation fluid is supplied to the internal void 3004. A strain-limiting side 2003 resists extension while the expanding side 3001 includes bellows features to promote extension as well as contraction upon a change in fluid pressure, either extension or contraction causing curling in one direction or another. Reinforcing ribs 3003 constrain expansion and contraction to occur primarily along the curling direction, and also provide some texture or ridges for grasping.

FIGS. 1A-1G depict a particular type of soft robotic actuator, sometimes referred to as an accordion-type soft actuator. However, numerous other types of soft actuators exist, some of which are described in connection with particular embodiments below. Soft actuators include actuators formed partially or entirely from soft or compliant materials, and may incorporate or surround more conventional hard actuator materials.

Soft actuators may move in a variety of ways. For example, soft actuators may bend, as shown above, or may twist, as in the example of the soft tentacle actuator described in U.S. patent application Ser. No. 14/480,106, entitled "Flexible Robotic Actuators" and filed on Sep. 8, 2014. In another example, soft actuators may be linear actuators, as described in U.S. patent application Ser. No. 14/801,961, entitled "Soft Actuators and Soft Actuating Devices" and filed on Jul. 17, 2015. Still further, soft actuators may be formed of sheet materials, as in U.S. patent application Ser. No. 14/329,506, entitled "Flexible Robotic Actuators" and filed on Jul. 11, 2014. In yet another example, soft actuators may be made up of composites with embedded fiber structures to form complex shapes, as in U.S. patent application Ser. No. 14/467,758, entitled "Apparatus, System, and Method for Providing Fabric Elastomer Composites as Pneumatic Actuators" and filed on Aug. 25, 2014.

One of ordinary skill in the art will recognize that other configurations and designs of soft actuators are also possible and may be employed with exemplary embodiments described herein.

End Effectors

An end effector may be the device at the end of a robotic arm, designed to interact with the environment, and/or may be the last link (or endpoint) of the robot. At an endpoint, tools may be attached; or, the end effector may itself act as a tool. An end effector may include one or both of a gripper or a tool. While grippers tend to hold, lift, transport and/or manipulate objects, tool functions often have a contrasting function, and may change a characteristic of the work object rather than gripping or holding it. Tool functions may include welding or fusing, spraying, dispensing, milling, screw or nut driving, flattening, cutting, and combinations of these.

At least four categories of end effector include impactive (e.g., jaws, claws, grasping a work object by direct impact, including holding friction); ingressive (e.g., penetrating the work object with needles, pins, or hackles); astrictive (e.g., essentially attractive or field forces such as Bernouilli lift, suction force, vacuum force, magnetic, electrostatic, van der Waals', ultrasonic standing waves, laser tweezing), and contigutive (e.g., essentially adhesive forces via capillary action, glue, surface tension, freezing, chemical reaction).

In hard robotics, gripping may performed by using a form-following static shape in the gripping surface (e.g., a concave cup to lift a round object), or by friction force increased by closing hard fingers, jaws or claws. A soft robotic end effector may include gripper functionality, and may also or alternatively include some tool functionality. Soft robotic grippers may be impactive, and may additionally be made ingressive, astrictive, and/or contigutive via a particular gripper/actuation morphology or configuration, or by adding an accessory tool within or along or opposite the soft robotic gripper.

A soft robotic gripper may include one or more soft robotic members, which may take organic prehensile roles of finger, arm, tail, or trunk, depending on the length and actuation approach. In the case of inflating and/or deflating soft robotic members, two or more members may extend from a hub, and the hub may include a manifold for distributing fluid (gas or liquid) to the gripper members and/or a plenum for stabilizing fluid pressure to the manifold and/or gripper members. The members may be arranged like a hand, such that the soft robotic members act, when curled, as digits facing, a "palm" against which objects are held by the digits; and/or the members may also be arranged like an cephalopod, such that the soft robotic members act as arms surrounding an additional central hub actuator (suction, gripping, or the like). Generally, although not exclusively, as used herein, the terms "base plate", "palm plate", "bumper plate", or "hub plate" may refer to a reference surface adjacent two or more soft robotic members against which the soft robotic member may hold a work object, e.g., when curled in a "closing" direction, and from which the grip of the soft robotic members on the work object may be released, e.g., when the soft robotic members are curled or recurled in an "opening" direction. The use of "plate" does not suggest that the member is fully planar—"plates", unless otherwise described, may have surface relief, contour, curves, peaks and valleys, texture, or the like—a "plate", unless otherwise described, describes a member fitting within a plate-like envelope or aspect ratio.

Soft robotic gripper members may be formed of elastomeric materials, such as rubber, and/or thin walls of plastic arranged in an accordion structure that is configured to unfold, stretch, and/or bend under pressure, or other suitable relatively soft materials. Soft robotic gripper members may include a channel and/or hollow interior that can be filled with a fluid, such as air, water, or saline to pressurize, inflate, and/or actuate the gripper member. Upon actuation, the shape or profile of the gripper member changes by, e.g., variably curving, curling, including in opposing directions, or straightening. Alternatively or in addition, the gripper member may be actuated using a vacuum to remove inflation fluid from the gripper member and thereby change the degree to which the gripper member bends, twists, and/or extends.

Actuation may also allow the gripper member(s) to exert a force on a workpiece, such as a workpiece being grasped or pushed, as well as partially or fully conforming to the shape of the workpiece being grasped. Soft robotic gripper members can also harmlessly deflect upon collision with workpieces or the work environment.

Exemplary Pressurized Housings

Figure 2:
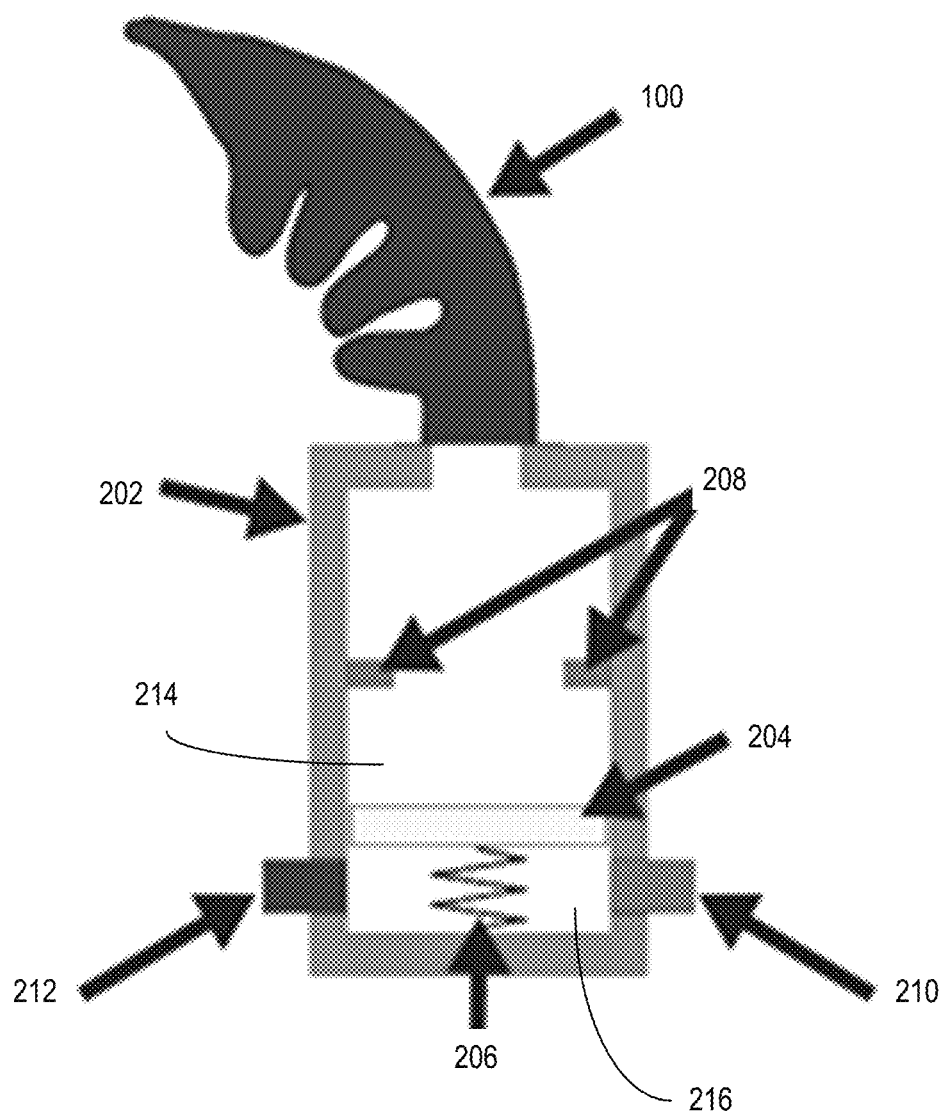
FIG. 2 is a cutaway view of an exemplary structure for a pressurized housing.

As noted above, existing actuator pressurization systems may be relatively heavy, complex, and may not be capable of supplying inflation fluid quickly or to a relatively high pressure. Exemplary embodiments provide a comparatively low-cost, light-weight, and simplified control mechanism that is capable of relatively fast and forceful actuation. One example of such a system is depicted in FIG. 2.

In one embodiment a soft actuator 100 is (or multiple soft actuators 100, such as may be used in a gripper) are attached to a housing 202 divided into two chambers 214, 216 that are separated by a spool and/or piston 204. The piston 204 may be connected to a spring 206 that biases the piston 204 towards the proximal end of the actuator 100.

An upper chamber 214 is fluidically connected to the reservoir 3004 inside the soft actuator 100 so that the upper chamber 214 and the soft actuator reservoir 3004 form a communal first space filled with a fixed amount of inflation fluid (e.g., air, water, hydraulic fluid). The lower chamber 216 defines a second space.

The lower chamber 216 may be provided with an inflation valve 210 through which an inflation fluid may be supplied to the lower chamber 216. Similarly, the lower chamber 216 may be provided with an exhaust valve 212 that allows an inflation fluid to be exhausted from the lower chamber 216. An amount of fluid present in the first space may be selected so that, when the exhaust valve 212 leading from the lower chamber 216 is opened (and no fluid is being supplied because the inflation valve 210 is in a closed configuration), the pressure in the first space balances the spring force applied by the spring 206 and the spring 204 is pushed downward to a first predetermined position.

FIG. 3A depicts the pressurized housing 202 in such an initial state. As shown, the actuator 100 is deflated and the piston 204 is in a lowered position. The actuator 100 may be inflated by supplying an inflation fluid to the lower chamber 216, as shown in FIG. 3B. This may be accomplished by opening the inflation valve 210 supplying the second space while closing the exhaust valve 212 from the second space. In this way, the piston 204 can be made to move up to decrease the volume of the first space. Thus, less space is available in the upper chamber of the housing 202 to accommodate the fixed amount of inflation fluid, which increases the pressure in the reservoir 3004 of the soft actuator 100. This causes the soft actuator 100 to inflate.

In order to deflate the soft actuator 100, the inflation fluid may be removed from the lower chamber 216. This may be accomplished by opening the exhaust valve 212 supplying the second space while closing the inlet valve 210 to the second space, as shown in FIG. 3C. As a result, the pressure in the second space returns to the ambient pressure of the surrounding room (as the exhaust valve provides an air path between the second space and the local environment). The pressure in the first space will decrease to an amount commensurate with the action of the spool's return spring 206 pulling the piston 204 to the bottom of the housing 202. This action forces the spool 206 away from the actuator 100 and provides an increased volume in the first space for the fixed amount of inflation fluid in the first communal space. The balance point may be manipulated by using a different spring 206 with a different spring constant to bias the piston 204 towards or away from the actuator 100.

It is noted that it is not necessary to employ a hard spool or piston to drive the inflation fluid. In some embodiments, the fluid in the upper chamber 214 (e.g., air) may be different from the fluid in the lower chamber 216 (e.g., water) such that the two fluids do not mix. When the fluid in the lower chamber 216 pushes against the fluid in the upper chamber 214, the fluid in the upper chamber 214 may be driven into the actuator 100. In other embodiments, the piston or hard spool may be replaced by a flexible medium, such as a diaphragm, or another device for parting the upper and lower portions.

The inlet valve 210 and/or exhaust valve 212 may be connected to relatively small and/or high pressure pneumatic or hydraulic lines. The exhaust valve 212 may optionally be a vacuum port, and optionally may be connected to a venturi generator. The use of a smaller tube may be advantageous because smaller tubes typically have a smaller bend radius than larger tubes. Consequently, it is easier to snake a small tube into a confined space. Furthermore, smaller tubes are less likely to kink up in applications where the gripper is mounted to a complex moving system, such as a robotic arm. Moreover, in applications where several independently addressable systems need to fit into a tight space, smaller tubes are more convenient to use than larger tubes. Still further, in the case where the soft robotic gripper is mounted to a robotic arm, the robotic arm is often provided with relatively small diameter pneumatic lines. Although it would be advantageous to use these existing lines instead of running new lines to the gripper, the small diameter of the existing lines make this difficult or impossible, given the relatively large size of the tubes needed to feed a conventional soft robotic actuator (resulting in an excessively slow rate of inflation of the actuator).

Relatively small tubes can be used in connection with the embodiments described herein because it takes a relatively small amount of force to drive the piston, given that the actuators typically need about 2-12 psi of fluid pressure for inflation. Even brief exposure to relatively high pressure air (e.g., at about 100 psi) in the second space 216 creates sufficient pressurization in the housing 202 to move the piston 204, and thus only a small molar quantity of fluid is needed. Thus, small tubes can be used to deliver that relatively small molar quantity.

In one example, a conventional soft robotic actuator may utilize tubing diameters in the range of 10-12 mm. With the exemplary embodiments described herein, a sufficient quantity of fluid could be delivered to the second space using a tube diameter of less than 10 mm, preferably 4-8 mm, and more preferably about 4 mm.

In further embodiments, the exhaust valve 212 may be replaced with an orifice, such as a pin hole opening, which further simplifies the design of the device. This opening may continuously leak air from the second space, thus allowing the actuator 100 to become slowly depressurized over time as air leaks from the second space.

In some embodiments, the orifice may be present in a disk that fits into an opening in the housing, such that one disk may be swapped for another. Different disks may include differently sized orifices, thus allowing for the rate of leakage to be adjusted by replacing the disk. Furthermore, the orifice may be used to create a time delay for system activation. As a result, actuation of the system may be made more gentle, which may prevent damage to the actuator or a grasp target.

Furthermore, changing the rate of inflation (e.g. using the above-noted orifices) may reduce the magnitude of undamped oscillation experienced by the actuator 100 during inflation. In other words, the actuators 100 may swing less violently when moving to the inflated state. The same can be said for a vacuum-driven reverse curl process if the rate of exhaust/evacuation is slowed.

Undamped oscillation is undesirable for applications where the actuators 100 are used in tight spaces and it is important for the actuators 100 to avoid colliding with a container or neighboring objects. By slowing the rate of inflation/evacuation, the grasp quality for such applications may be improved.

The inflation fluid present in the upper chamber may be the same as, or different than, the inflation fluid supplied to the lower chamber. Either or both of the upper chamber and the lower chamber may be hydraulically or pneumatically controlled. In some embodiments, either or both of the inflation fluids may be air.

Figures 4A, 4B, 4C:
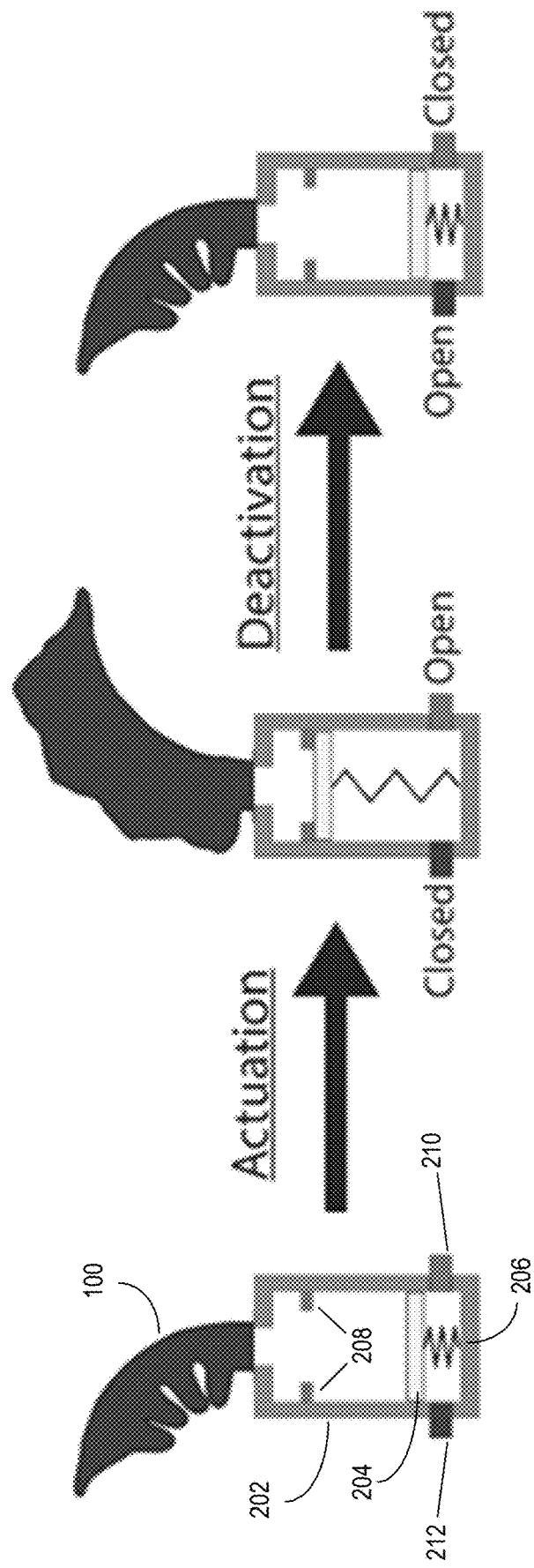
FIGS. 4A-4C depict an alternative configuration for the hard stops of the exemplary pressurized housing.

As shown in FIGS. 2 and 3B, the movement of the spool and/or piston into the upper chamber may be limited by one or more hard stops 208. The hard stops 208 may be positioned so as to limit the minimum volume of the first space in order to fix the maximum pressure inside the actuator 100. By placing the hard stops at a relatively low position, the maximum pressure may be set relatively low, as shown in FIGS. 3A-3C. By placing the hard stops at a relatively high position, the maximum pressure may be set relatively high, as shown in FIGS. 4A-4C.

The hard stops 208 may also function as a safety feature that prevents high pressure air/fluid from causing a catastrophic failure at a damaged actuator 100. Conventionally, when an actuator is damaged, high pressure fluid may be vented from the damaged portion, causing the actuator to catastrophically fail (e.g., popping), thereby dropping or launching a gripped object. In exemplary embodiments, the existence of the hard stops 208 means that the air used for bending the actuator is decoupled from the air used to activate and deactivate the system. Accordingly, the risk of over-pressurizing the actuator is reduced or eliminated.

Because the piston 204 may be driven (in the system's actuated state) against the hard stops 208 with house air, it may be difficult or impossible to sufficiently relieve pressure on the actuator(s) 100 by driving the piston 208 head backward. As a result, the actuators 100 could be damaged. To address this potential issue, it may be advantageous to include a pressure sensor in the actuator-facing section (e.g., the upper portion 214) of the housing 202 capable of detecting over-pressure situations. Over-pressure may be detected, e.g., based on deflection and/or compression. Upon detecting an over-pressure situation, a fault signal may be transmitted to a controller, which shuts down (deactivates) the system, and/or provides a warning or a push notification to the operator or a system computer. In another embodiment, a warning signal may be transmitted upon detecting an over-pressure situation, informing an operator of the system that the actuator is being operated in a manner that may reduce its lifespan.

Still further, the pressure sensor could be used as part of a closed-loop control system that shuts off the supply of high pressure to the lower portion 216 of the housing 202 when the upper portion 214 of the housing has hit a desired set pressure. In this way, the closed-loop controller may achieve any desired inflation pressure for the actuator. Alternatively, the pressure sensor could be used with a closed loop controller to shut off the valve 212 that exhausts/or evacuates the lower housing when the upper portion 214 has achieved a desired level of vacuum. In this way the system can achieve any desired amount of reverse curl.

Still further, if the sensor is reading a low pressure in the actuator 100 (a pressure that is lower than the intended inflation pressure) this may be an indication of a hole in the actuator 100 or a leak in the housing 202.

A low or high measurement by the pressure sensor could result in a variety of events, such as: 1) a real-time warning message being sent to the plant's manager to tell them there is a problem with their manufacturing line, 2) automatically stopping the machine the actuator is a part of, 3) stopping the entire manufacturing line, 4) instructing the manufacturing line to redirect work to a duplicate machine on the line that does not have a broken actuator, or 5) any of a number of other programmed responses.

Figure 5:
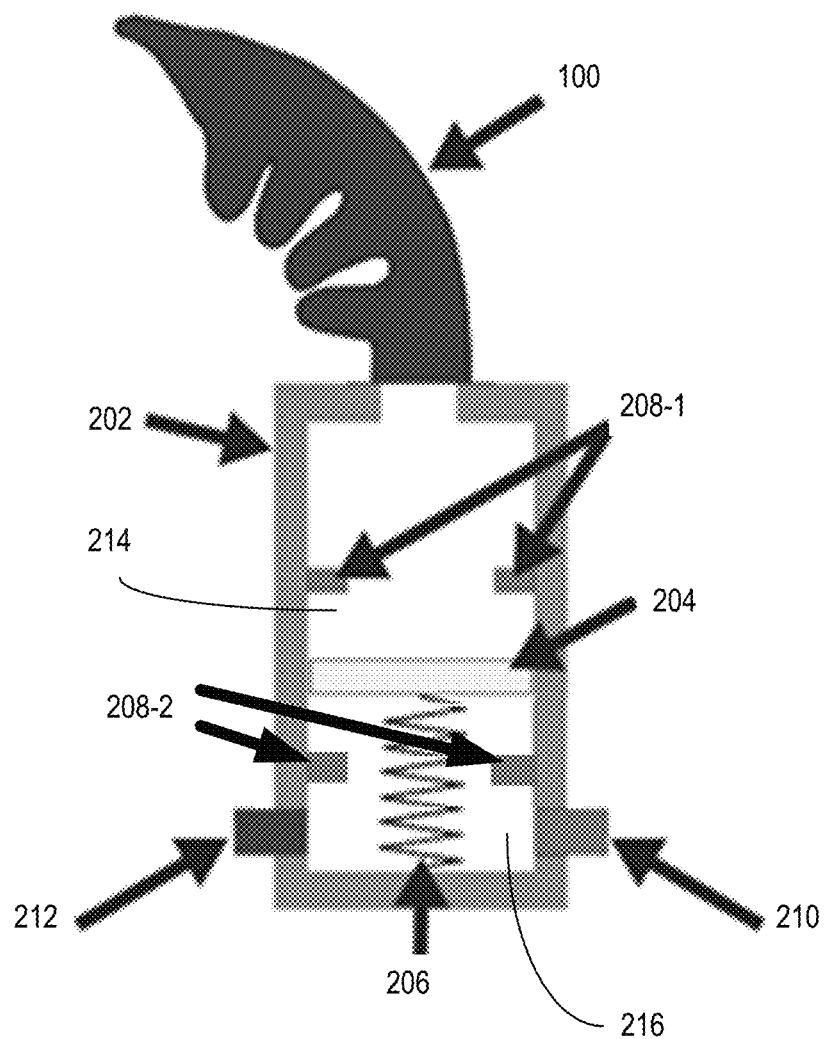
FIG. 5 depicts an alternative structure for the housing including two sets of hard stops.

As shown in FIG. 5, a second set of hard stops 208-2 placed below the piston 204 (i.e., in the lower chamber 214) may be used to define a degree of reverse curl of the actuator 100. As inflation fluid is removed from the actuator 100, the actuator 100 may return to a resting or neutral state. If actuation fluid continues to be removed beyond the neutral state, the actuator 100 may be configured to curl in a direction opposite to the actuation direction (i.e., away from the grasping surface of the actuator). In order to facilitate removal of the inflation fluid from the actuator (i.e., by increasing the volume in the first space by enlarging the upper chamber), a return spring 206 may draw the piston 204 backwards, into the lower chamber 216. The optional second hard stops 208-2 may establish a lower limit to which the spring 206 can be drawn, thus defining a maximum volume available to the first communal space defined by the upper chamber 214 and the actuator reservoir 3004. Accordingly, the maximum amount of reverse curl may be regulated.

The first hard 208-1 stops and/or the second hard stops 208-2 may be static so as to define a maximum positive and a maximum negative pressure. Alternatively, either or both of the hard stops 208-1, 208-2 may be adjustable so as to reconfigure the maximum amounts of forward curling or reverse curling for different applications.

The piston 204 may be any of a number of structures, such as a spool, disk, piston head, etc. In addition to or as an alternative to hydraulic or pneumatic control, the piston 204 may be moved by other means, such as electric motor or mechanical linkage.

Although FIG. 2 depicts the pressurizing housing 202 attached to a single actuator 100, a single housing 202 could also be used to control multiple actuators 100. This may be useful, for example, in order to control a gripper made up of several actuators 100 that are intended to be actuated together.

Although the above examples have been provided to describe the system, other configurations and variations are contemplated. For example, the system need not be driven by air. Instead, an electric motor or a solenoid may drive a piston rod.

In another example, hydraulic fluid may be used in the actuators, which may be forced into the actuators through action of air provided in the lower part of the housing, or vice versa. Likewise, the system could be provided entirely with hydraulic fluids (e.g., liquid in the actuator and the lower part of the housing 202), or may be entirely pneumatic. In the hydraulic case, a single port may be used as an inlet and an outlet.

Furthermore, the inlet port 210 or exhaust port 212 may include interchangeable orifices of different sizes, in order to easily change the rate of inflation or deflation of the actuators. The exhaust port may also be replaced with a small orifice that bleeds air at a relatively slow rate. When pressurized, the system is able to overcome this slow bleed; when depressurized, fluid may leak from the orifice to remove pressure from the housing. As a result, no valve is necessary at the exhaust port 212. This reduces the complexity and cost of the system, and also allows the inflation and/or deflation time of the actuator 100.

On the other hand, the exhaust port 212 may be replaced by a venturi vacuum generator. When pressurized air is provided to the venturi, it pulls air from the housing 202, which allows the system to be depressurized more quickly.

Advantageously, exemplary embodiments can rely upon a compressor provided remotely from the finger to be inflated, such as a compressor provided in the building housing the robotic system (potentially as part of a larger system involving many soft robotic actuators).

In one example, an exemplary embodiment may be supplied with air from a compressor provided in a mechanical room of the facility in which the actuator is deployed, without alteration of the air pressure before arrival at the housing. Soft robotic systems typically only require a relatively small pressure change (e.g., in the range of 2-12 psi) to inflate an actuator. Conventionally, soft robotic systems either utilize special-purpose compressors capable of providing such a relatively low amount, or connect to the facility's house system, which provides air at a much higher pressure (e.g., 100 psi). To accommodate the higher pressure, conventionally a regulator is used to step the house air pressure down to the grip air pressure.

In contrast, the system described herein decouples the fluid provided to the internal void of the soft actuator from the fluid used to drive the piston. Consequently, the regulator can be removed, further reducing the size, cost, and complexity of the system.

In some embodiments, the valves may be provided on or near the housing, and electric lines may be run to the housing to control the valves. In others, the valves may be located remotely from the housing, with a pneumatic or hydraulic line run from the valves to the housing.

Example Method

Figure 6:
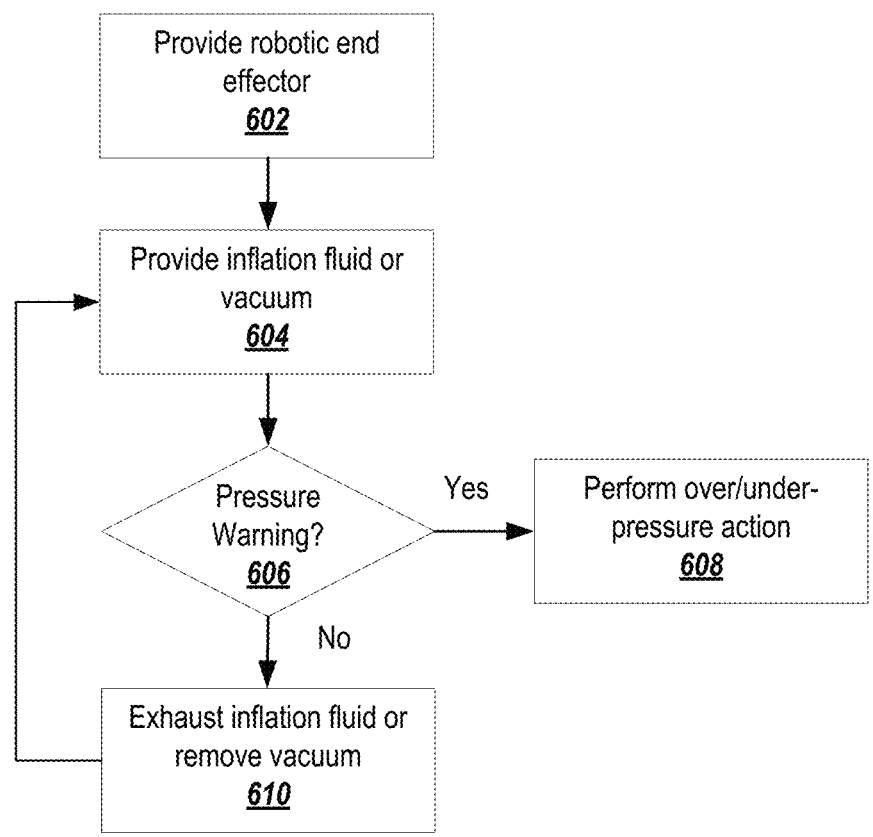
FIG. 6 is a flowchart describing an exemplary grasping technique in accordance with exemplary embodiments.

FIG. 6 describes a procedure for deploying and using an end effector as described above. The actions described in FIG. 6 may be embodied as instructions performed by a controller that controls an end effector.

At block 602, an end effector may be provided. The end effector may include a pressurizable housing as described above.

At block 604, an inflation fluid may be supplied to the lower chamber. The inflation fluid may be supplied via the inlet port. A predefined amount of inflation fluid may be supplied (e.g., via a compressor) in order to achieve a desired amount of bend in the actuator. In some embodiments, the amount of inflation fluid supplied may be a dynamically-determined amount computed by the controller based on a desired amount of bend for the actuator.

Alternatively, a vacuum may be applied at the lower chamber by removing fluid from the lower chamber. This allows the actuator to reverse-curl. The amount of fluid removed may be selected based on the desired amount of reverse-bend.

At block 606, the system may determine whether the application of the inflation fluid or vacuum has caused a pressure abnormality. The pressure abnormality may be detected by a pressure sensor provided in the upper chamber.

If a pressure abnormality is detected at block 606, then at block 608 the controller may trigger an over- or under-pressure action, as appropriate. The action may include, for example, transmitting a real-time warning message to an operator of the robotic system, automatically stopping the machine the actuator is a part of, stopping the entire manufacturing line, instructing the manufacturing line to redirect work to a duplicate machine on the line that does not have a broken actuator, or any of a number of other programmed responses.

If a pressure abnormality is not detected at block 606, then at block 610 the inflation fluid or vacuum may be exhausted to return the pressurizable housing to a neutral configuration. This process may be repeated by returning to block 604, so that the end effector may be used to grasp another object.

The above-described method may be embodied as instructions or logic stored on a non-transitory computer-readable medium. When executed, the instructions or logic may cause a processor circuit to perform the above-described method using a robotic system.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

In the foregoing description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Any or all of the above-described techniques may be implemented by suitable hardware, including pneumatic, hydraulic, mechanical, electrical, magnetic, etc. hardware. Some embodiments may utilize logic stored on a non-transitory computer-readable medium. When executed by one or more processors, the logic may cause the processors to perform the techniques identified above. The logic may be implemented fully or partially in hardware. The logic may be included as part of a controller for controlling the actuation, de-actuation, movement, position, etc. of a soft robotic actuator and/or a soft robotic system employing one or more actuators in a gripper arrangement.

As used herein, structures, acts, steps, and functions are given various names or labels. This paragraph describes terminology that is used alternatively, in some cases interchangeably, and in some cases equivalently. Generally, one of skill in the art will recognize and understand identity, equivalency, and the similarities and differences among alternative terms of art and/or words having a plain technical meaning. As used herein, an end effector may include an effector including a tool or one to which a tool may be mounted, including EOAT 202 and the like. Bendable members may include soft robotic members such as soft robotic actuators 100.

I claim:

1. A robotic end effector comprising:
    a soft robotic actuator comprising an elastomeric outer surface surrounding an internal void, wherein the soft robotic actuator is configured to curl when an inflation fluid is supplied to the internal void;
    a pressurizable housing divided into a first space and a second space, the first space being in fluid communication with the internal void, wherein a fixed amount of inflation fluid is present in the first space and a volume of the first space is manipulable to alter an internal pressure of the internal void, the inflation fluid selected from the group consisting of air, saline, carbon dioxide, or nitrogen; and
    a piston dividing the first space from the second space, wherein the piston is movable to adjust a volume of the first space and the piston is driven by one or more of an electric motor or a mechanical linkage.

2. The end effector of claim 1, further comprising:
    an inlet port for supplying a second space fluid to the second space;
    tubing connected to the inlet port; and
    an outlet port for exhausting the second space fluid from the second space.

3. The end effector of claim 2, wherein a diameter of the tubing is less than 10 mm.

4. The end effector of claim 2, wherein a diameter of the tubing is about 4 mm.

5. The end effector of claim 1, wherein the outlet port is a valve.

6. The end effector of claim 1, wherein the outlet port comprises a pinhole opening.

7. The end effector of claim 6, wherein the pinhole opening is an orifice present in a disk capable of being inserted into the outlet port.

8. The end effector of claim 1, wherein the pressurizable housing is connected to a plurality of soft robotic actuators.

9. The end effector of claim 1, further comprising a set of upper stops between the piston and the actuator in the first space.

10. The end effector of claim 9, wherein the upper stops are adjustable.

11. The end effector of claim 1, further comprising a set of lower stops in the second space.

12. The end effector of claim 11, wherein the lower stops are adjustable.

13. The end effector of claim 1, further comprising a pressure sensor present in the first space.

14. The end effector of claim 1, wherein the second space fluid is a pneumatic fluid.

15. The end effector of claim 1, wherein the second space fluid is a hydraulic fluid.

16. A method comprising:
    providing a robotic end effector according to claim 1; and
    supplying the second space fluid to an inlet port in fluid communication with the second space.

17. The method of claim 16, further comprising exhausting a second space fluid present in the second space via an exhaust port.

18. The method of claim 16, further comprising receiving an indication at a controller that a pressure in the first space is unexpectedly low or unexpectedly high.

19. The method of claim 18, wherein, in response to the indication, the controller is configured to transmit a warning message to an operator of the end effector.

20. The method of claim 18, wherein, in response to the indication, the controller is configured to perform at least one of the following actions:
    automatically stopping a machine to which the end effector is attached;
    stopping a manufacturing line including the machine to which the end effector is attached; or
    redirecting work from the machine to which the end effector is attached to another machine present on the same manufacturing line.

* * * * *